US012196165B2

(12) United States Patent
Clemen

(10) Patent No.: US 12,196,165 B2
(45) Date of Patent: Jan. 14, 2025

(54) FUEL NOZZLE HAVING DIFFERENT FIRST AND SECOND DISCHARGE ORIFICES FOR PROVIDING A HYDROGEN-AIR MIXTURE

(71) Applicant: Rolls-Royce Deutschland Ltd & Co KG, Blankenfelde-Mahlow (DE)

(72) Inventor: Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 304 days.

(21) Appl. No.: 17/728,419

(22) Filed: Apr. 25, 2022

(65) Prior Publication Data

US 2024/0200521 A1 Jun. 20, 2024

(30) Foreign Application Priority Data

Apr. 26, 2021 (DE) ..................... 10 2021 110 616.8

(51) Int. Cl.

*F02M 61/00* (2006.01)
*F02B 77/11* (2006.01)
*F02M 21/02* (2006.01)
*F02M 23/00* (2006.01)
*F02M 61/18* (2006.01)

(52) U.S. Cl.

CPC ........... *F02M 61/184* (2013.01); *F02B 77/11* (2013.01); *F02M 21/0206* (2013.01); *F02M 21/0275* (2013.01); *F02M 23/006* (2013.01)

(58) Field of Classification Search

CPC ............. F02M 61/184; F02M 21/0206; F02M 21/0275; F02M 23/006; F02B 77/11

See application file for complete search history.

(56) References Cited

U.S. PATENT DOCUMENTS 6,082,113 A * 7/2000 Prociw .................. F23D 11/107 60/748
6,289,676 B1 * 9/2001 Prociw .................. F23D 11/383 60/740
6,863,228 B2 * 3/2005 Mao .......................... F23R 3/28 239/405
8,146,365 B2 * 4/2012 Shum ........................ F23R 3/10 60/740

(Continued)

OTHER PUBLICATIONS

German Search Report dated Sep. 29, 2021 from counterpart German Patent Application No. 10 2021 110 616.8.

*Primary Examiner* — Phutthiwat Wongwian
*Assistant Examiner* — Sherman D Manley
(74) *Attorney, Agent, or Firm* — SHUTTLEWORTH & INGERSOLL, PLC; Timothy J. Klima

(57) ABSTRACT

The proposed solution relates to a fuel nozzle for the injection of hydrogen into a combustion chamber of an engine, the fuel nozzle including, for provision of a hydrogen-air mixture, a nozzle head having outflow openings (19, 21) at an end face of the nozzle head.

Figure 2:
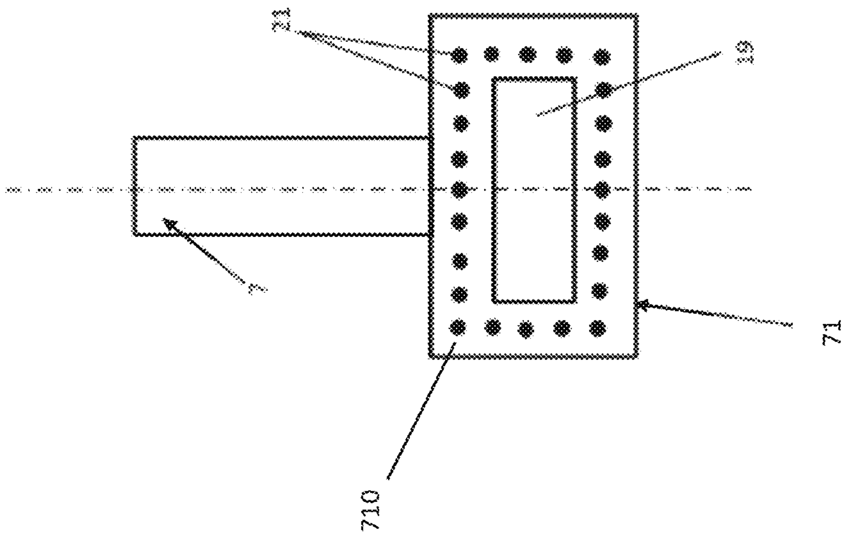

Multiple first outflow openings for hydrogen to be injected and at least one second outflow opening for air to be injected are present at the end face for the provision of the hydrogen-air mixture, where the at least one second outflow opening has a polygonal cross section and the multiple first outflow openings at the end face are arranged around the at least one second outflow opening.

16 Claims, 12 Drawing Sheets

(56) References Cited

U.S. PATENT DOCUMENTS

| | | | | |
|---|---|---|---|---|
| 8,919,132 | B2 * | 12/2014 | Oskam | F23R 3/28<br>60/737 |
| 9,182,124 | B2 * | 11/2015 | Oskam | F23D 14/22 |
| 9,534,787 | B2 * | 1/2017 | Westmoreland | F23R 3/286 |
| 9,651,259 | B2 * | 5/2017 | Boardman | F23R 3/286 |
| 9,709,279 | B2 * | 7/2017 | Crothers | F23R 3/04 |
| 9,765,973 | B2 * | 9/2017 | Chila | F23R 3/10 |
| 10,344,982 | B2 * | 7/2019 | Berry | F23R 3/28 |
| 10,731,860 | B2 * | 8/2020 | Donovan | F23R 3/28 |
| 11,253,823 | B2 * | 2/2022 | Ryon | F23D 11/107 |
| 2014/0053528 | A1 * | 2/2014 | Crothers | F23R 3/18<br>60/39.37 |
| 2021/0199298 | A1 * | 7/2021 | Berry | F23R 3/36 |
| 2021/0285640 | A1 * | 9/2021 | Staufer | F23R 3/14 |

* cited by examiner

Prior Art

FUEL NOZZLE HAVING DIFFERENT FIRST AND SECOND DISCHARGE ORIFICES FOR PROVIDING A HYDROGEN-AIR MIXTURE

This application claims priority to German Patent Application DE102021110616.8 filed Apr. 26, 2021, the entirety of which is incorporated by reference herein.

The proposed solution relates to a fuel nozzle for an engine, especially for an engine operated with hydrogen.

In engines that have been in customary practical use to date, for example those operated with kerosene as fuel, in a combustion chamber, the air and fuel are injected into a combustion space of the combustion chamber via at least one fuel nozzle, in order to provide an ignitable air-fuel mixture. The fuel nozzle for provision of the air-fuel mixture comprises a nozzle head having outflow openings at an end face of the nozzle head. This end face, in the intended installation state of the fuel nozzle, faces a combustion space of the combustion chamber. Typically, the fuel here is injected via a first outflow opening that appears to be circular at the end face. The first outflow opening for the fuel is thus configured in the manner of an annular gap. A second outflow opening for air to be injected, which is on the radial inside based on a main flow direction of the fuel to be injected, also typically has a circular progression at the end face. The same applies to at least one additional third passage opening at the end face of the nozzle head or at a passage opening that accommodates the nozzle head in a heat shield of the combustion chamber. The multiple different outflow openings for air and fuel thus typically each take the form of circular rings in the manner of annular gaps in terms of their cross section. This is then also regularly associated with a circular cylindrical design of the nozzle head of the fuel nozzle.

While the above-described configuration of a nozzle head of a fuel nozzle has proven itself for liquid fuel to be injected, for example kerosene, there is further need for improvement in respect of fuel nozzles for utilization in an engine with regard to engines operated with a gaseous fuel, e.g. hydrogen, and hence fuel to be injected in gaseous form.

In this respect, the proposed fuel nozzle provides a remedy.

Thus, a proposed fuel nozzle has, at an end face of its nozzle head, multiple first outflow openings for hydrogen to be injected and at least one second outflow opening for air to be injected for the provision of a hydrogen-air mixture. The at least one second outflow opening here has a polygonal cross section, and the multiple first outflow openings for the hydrogen are distributed at the end face around the at least one second outflow opening.

The solution proposed can achieve the effect that, at the end face of the nozzle head, a multitude of hydrogen injection streams in the direction of the combustion space can be provided, which exit in a distribution at the end face of the nozzle head. This especially includes the first outflow openings for the hydrogen to be introduced each having a first cross-sectional area and a first flow cross section which is merely a fraction of a second cross-sectional area or a second flow cross section possessed by the at least one second outflow opening for the air to be injected. In this way, in that case, for example in relation to the at least one second outflow opening, the first outflow openings for the hydrogen to be injected are virtually point openings, and consequently, in a front view of the end face, are a plurality or multitude of discrete exit holes that appear like dots and hence provide sources for a plurality or multitude of hydrogen inflows into the combustion space. The arrangement of the first outflow openings around the at least one second outflow opening permits, for a gaseous fuel to be injected (and hence more particularly for the provision of an ignitable hydrogen-air mixture), more advantageous mixture formation than in the case of fuel nozzles customary to date with a comparatively large-area first outflow opening in the form of a surrounding circular ring for the fuel to be injected.

Advantageous mixture formation, for example for an ignitable hydrogen-air mixture, is also assisted here by the polygonal cross section of the at least one second outflow opening intended for air to be injected. It is thus possible thereby to provide a geometrically comparatively sharply delimited air flow exiting at the end face of the nozzle head, around which a multitude of distinct hydrogen flows from the first outflow openings is generated.

For the configuration of the at least one second outflow opening for the air to be injected, a polygonal cross section in particular has been found to be advantageous. More particularly, the second outflow opening at the end face of the nozzle head may have a rectangle-shaped, especially rectangular, or trapezoidal cross section.

Alternatively or additionally, it may be the case that the at least one second outflow opening and/or at least one flow duct of the nozzle head that opens into the at least one second outflow opening has at least one air guide element for swirling of exiting air. The air to be injected is thus provided with a swirl via at least one air guide element at the at least one second outflow opening and/or upstream of the at least one second outflow opening in a flow duct of the nozzle head. The air flow exiting at the at least one second outflow opening thus has a rotational movement component which is beneficial for maximum homogeneity of mixture formation downstream of the nozzle head.

In one design variant, two or more second outflow openings at the end face are provided, around which the respective multiple first outflow openings for hydrogen to be injected are distributed. In such a design variant, for example, not just one single (central) second outflow opening for air to be injected is thus provided at the end face of the nozzle head. Instead, multiple (at least two) second outflow openings are present at the end face. In that case, multiple first outflow openings for hydrogen to be injected are arranged around each of these second outflow openings. In this way, it is possible to achieve the effect that each air flow from a second outflow opening is surrounded by multiple hydrogen flows from first outflow openings.

In one design variant, the two or more second outflow openings at the end face are arranged successively in a circumferential direction. The second outflow openings for air to be injected are thus alongside one another at the end face. In this case, the second outflow openings are alongside one another, for example, along a curved or linear profile line, such that, for example, a series of second outflow openings is provided at the end face, with each individual second outflow opening itself surrounded at the end face by a multitude of first outflow openings for hydrogen to be injected.

In one design variant, the multiple first outflow openings, for example, each have a circular, rhombus-shaped or hexagonal cross section. As already elucidated above, in particular, such a circular, rhombus-shaped or hexagonal cross section or a cross-sectional area of a first outflow opening thus defined at the first end face may be much smaller than a cross section or cross-sectional area of a second outflow opening for air to be injected. A cross-sectional area of a second outflow opening is, for example, many times larger than a cross-sectional area of a first outflow opening. In particular, in this connection, it may be the case that the cross-sectional area of a second outflow opening is at least five times greater than a cross-sectional area of each first outflow opening.

In one design variant of the solution proposed, the end face, in a rejection of configurations in customary practical use to date, is not circular, and hence the nozzle head is not necessarily in circular cylindrical form. Instead, the end face of the nozzle head, in one design variant, is quadrangular, especially rectangular. Accordingly, the cross section of the nozzle head at the end face is then also quadrangular, especially rectangular.

Alternatively or additionally, the end face of the nozzle head may have two main edges running essentially parallel to one another, which each extend along a circular arc, and two lateral edges that connect the main edges to one another. An outline of the end face here is consequently defined by the two main edges and the two lateral edges, with the two main edges each following a circular arc section and running essentially parallel to one another. More particularly, the end face of such a design variant may also be tetragonal and/or elongated based on a circumferential direction. In the installed state of the fuel nozzle, for example, such a circumferential direction may point circumferentially about a center axis of the engine along which different components of the engine, for example compressor, combustion chamber and turbine of the core engine, are arranged in axial succession, and which runs parallel to a main flow direction along which air flows through the engine.

The proposed solution also includes a combustion chamber assembly having a combustion chamber for an engine, in which at least one design variant of a proposed fuel nozzle for injection of a hydrogen-air mixture is provided.

A combustion chamber of such a combustion chamber assembly may have, for example, in the region of a combustion chamber head, a heat shield having a passage opening in which the nozzle head of the fuel nozzle is accommodated. The heat shield here typically faces the combustion space of the combustion chamber by an inner face. In order to additionally provide air in the combustion space beyond the nozzle head, it is possible to form at least one additional outflow opening between the nozzle head and an edge of the passage opening on the heat shield side. By means of this at least one additional outflow opening, air flowing past outside the nozzle head likewise gets into the combustion space in operation of the engine.

Especially for improvement of mixture formation and mixture guiding in the case of injection of gaseous fuels such as hydrogen and hence the operation of an engine with such a fuel, in one design variant, the at least one additional outflow opening is formed by a gap which is longitudinally extended with regard to the end face of the nozzle head and runs along a section of the outer circumference of the nozzle head.

In a first possible development, in that case, for example, at least two spatially separated additional outflow openings are formed between the nozzle head and the edge of the passage opening. There are thus local, mutually spatially separated additional (third) outflow openings for additional air flows by virtue of the passage opening on the heat shield side. Corresponding gaps can thus be provided, for example, at the outer circumference of the nozzle head in the case of an annular combustion chamber that extends around a center axis of the engine, firstly on the radial inside and secondly on the radial outside.

In an alternative configuration, an additional (third) outflow opening between the nozzle head and the edge of the passage opening is formed around the full circumference of the nozzle head. In such a configuration, in that case, for example, no individual additional outflow openings that are locally separated from one another are provided. Instead, in a front view of the end face of the nozzle head, for example, a gap running around the circumference of the nozzle head is apparent. Such a gap is, moreover, not in the form of a circular ring in one development. Instead, the additional outflow opening running around the full circumference of the nozzle head may have a rectangular outline.

Part of the proposed solution is also an engine having a design variant of a proposed combustion chamber assembly. For example, a hydrogen-driven engine is provided, which thus envisages, at a combustion chamber head of a combustion chamber of the combustion chamber assembly, at least one design variant of a proposed fuel nozzle for the effective provision of a hydrogen-air mixture.

The appended figures illustrate, by way of example, possible design variants of the proposed solution.

Figure 1:
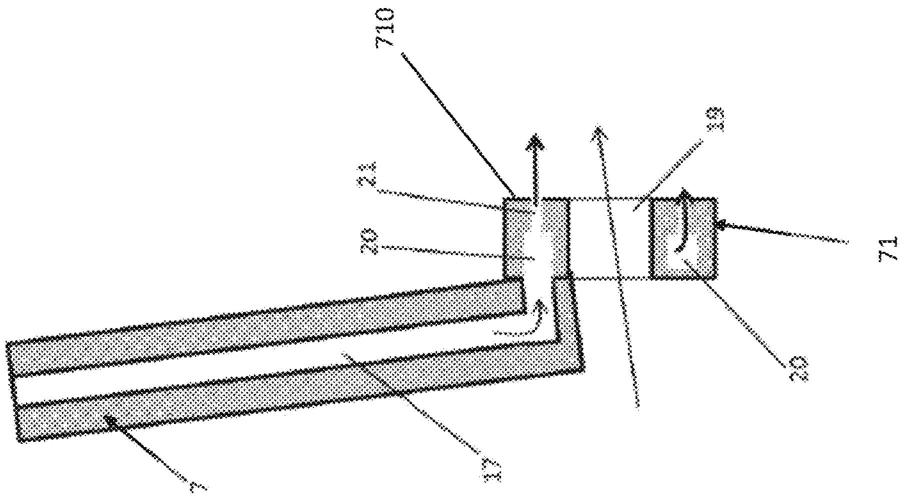
Figure 3:
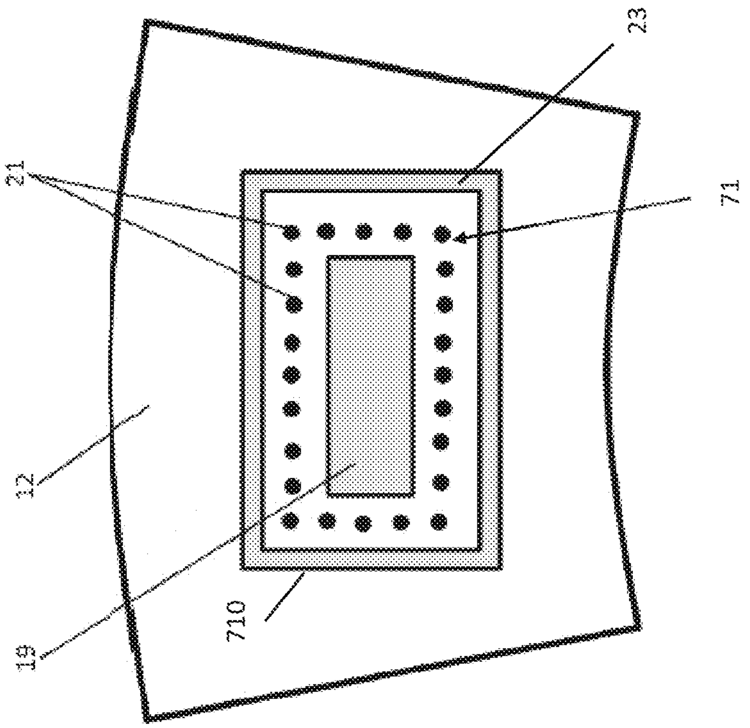
Figure 2A:
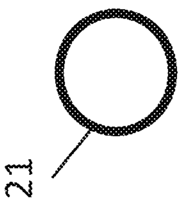
Figure 2B:
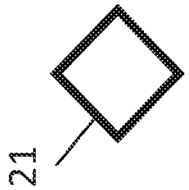
Figure 2C:
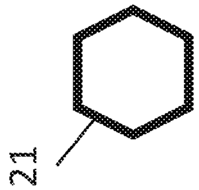
Figure 4:
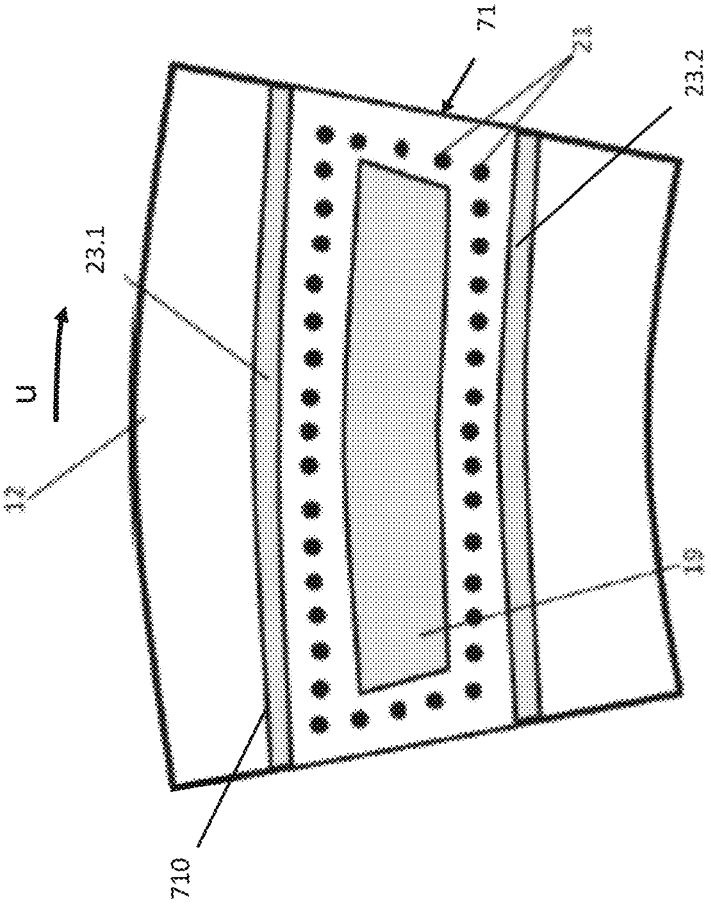
Figure 5:
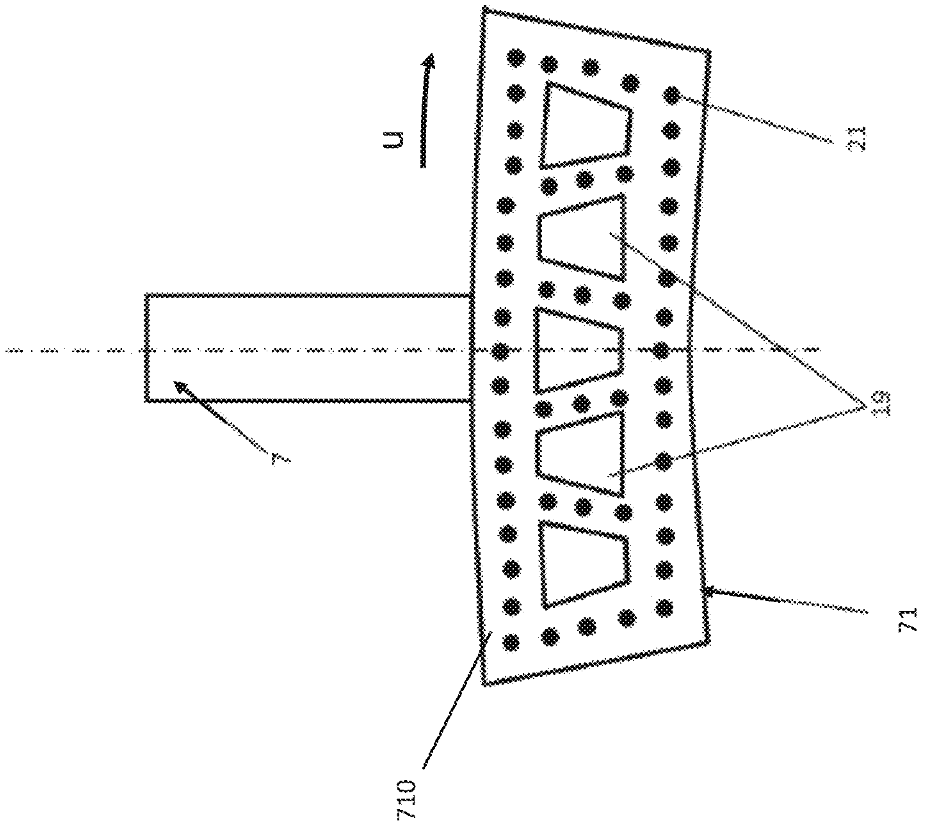
Figure 6:
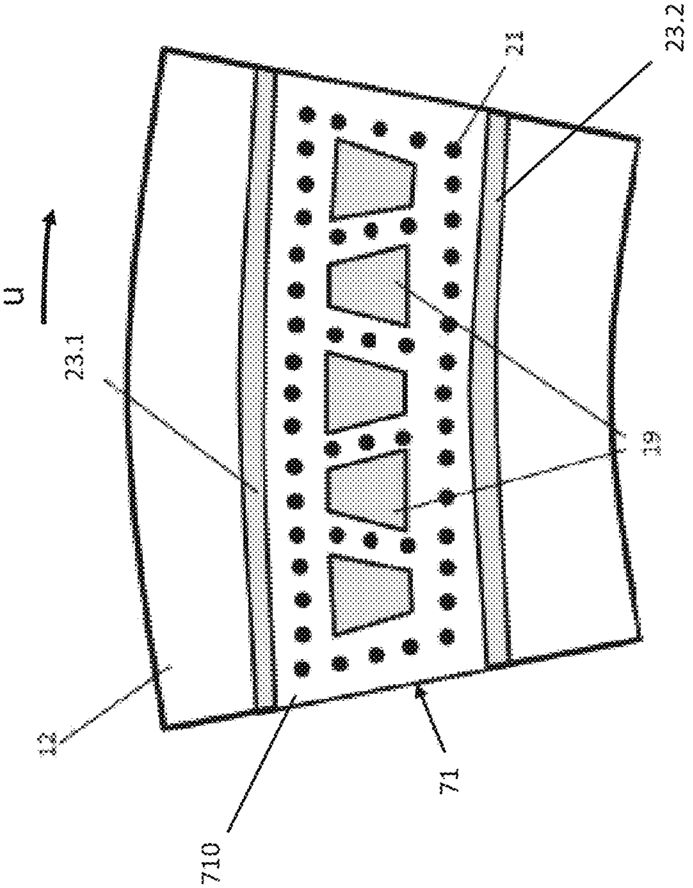
Figure 7B:
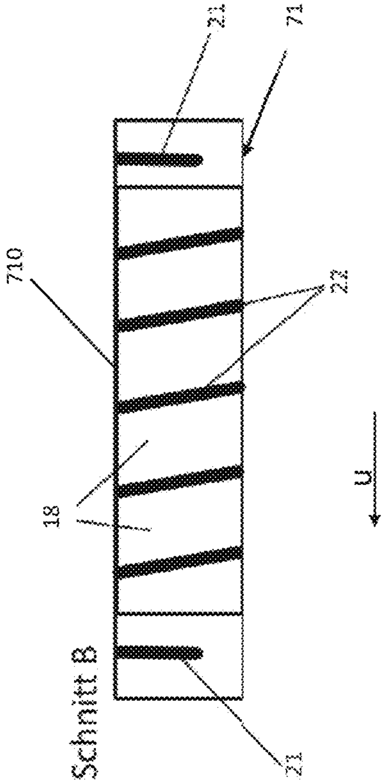
Figure 7A:
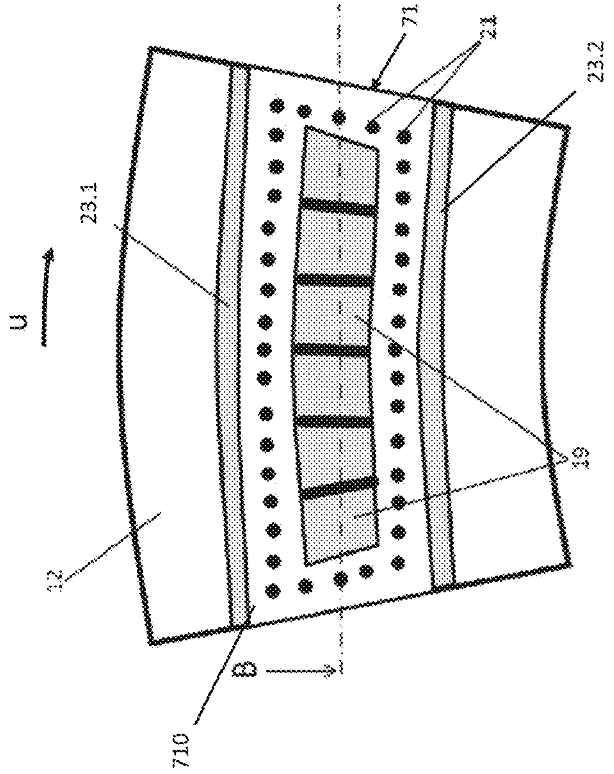
Figure 8A:
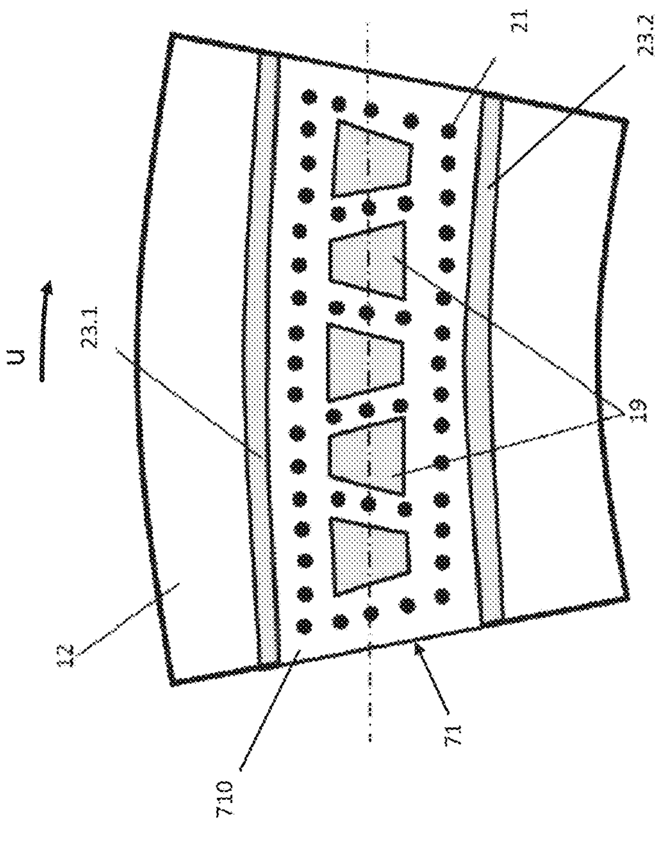
Figure 8B:
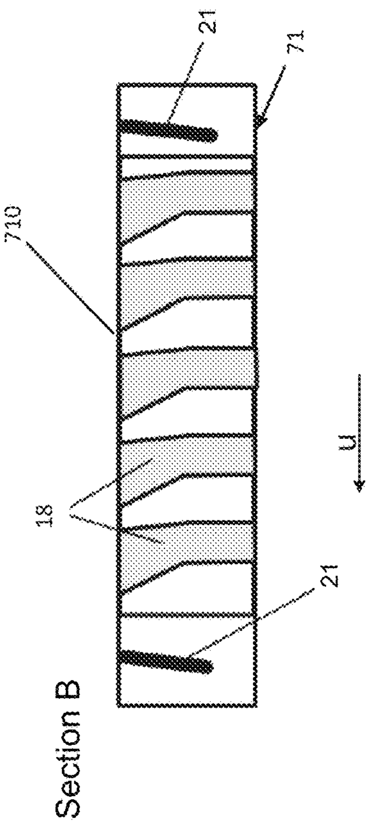
Figure 9:
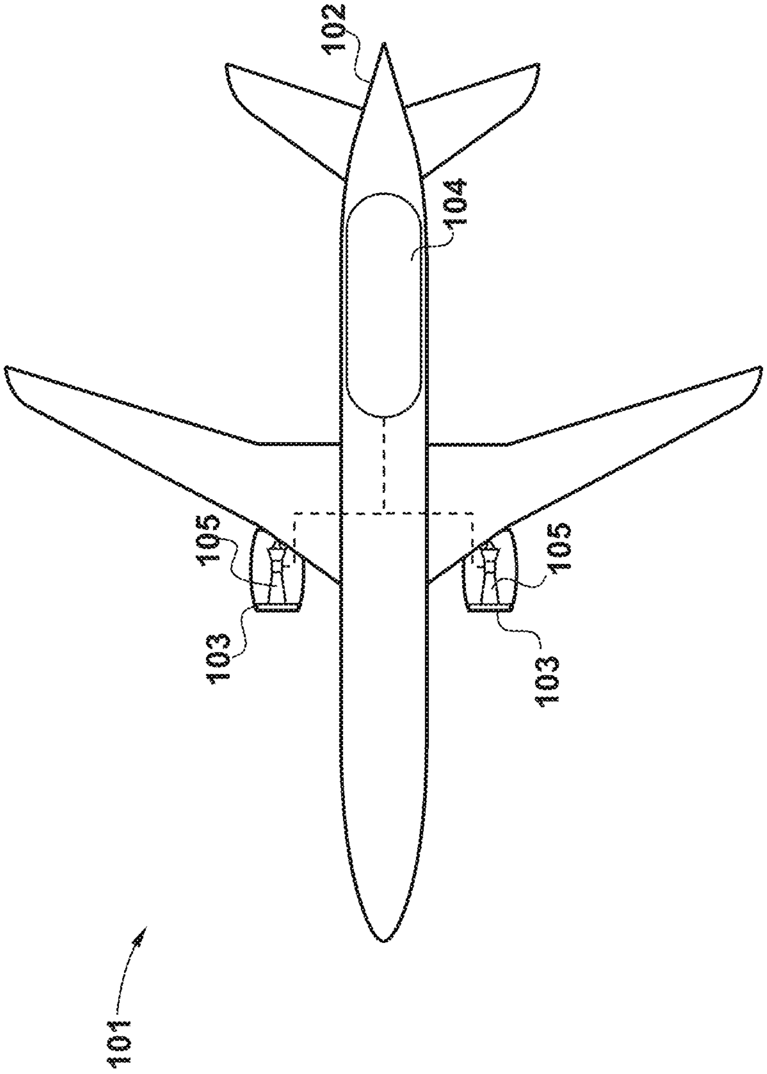
Figure 10:
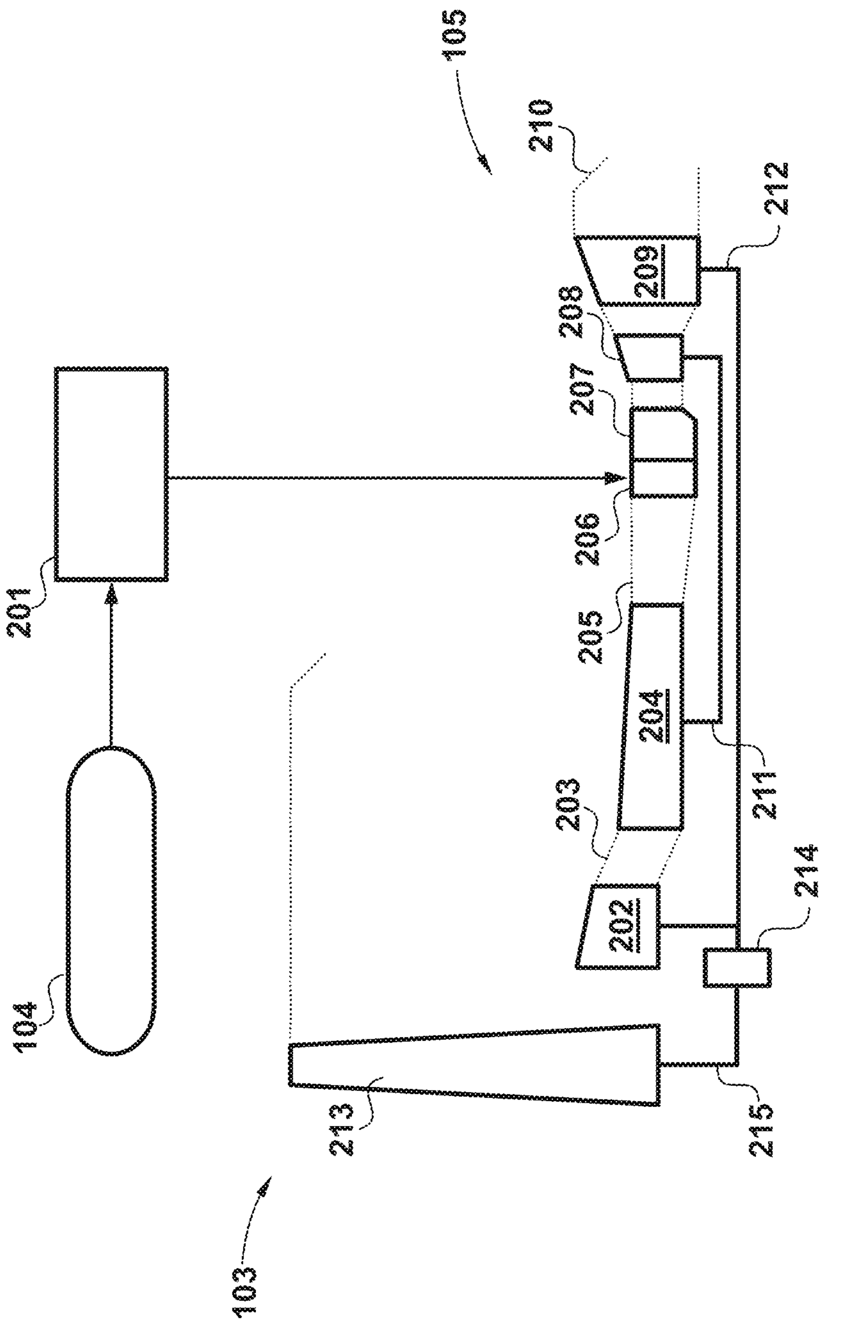
Figure 11:
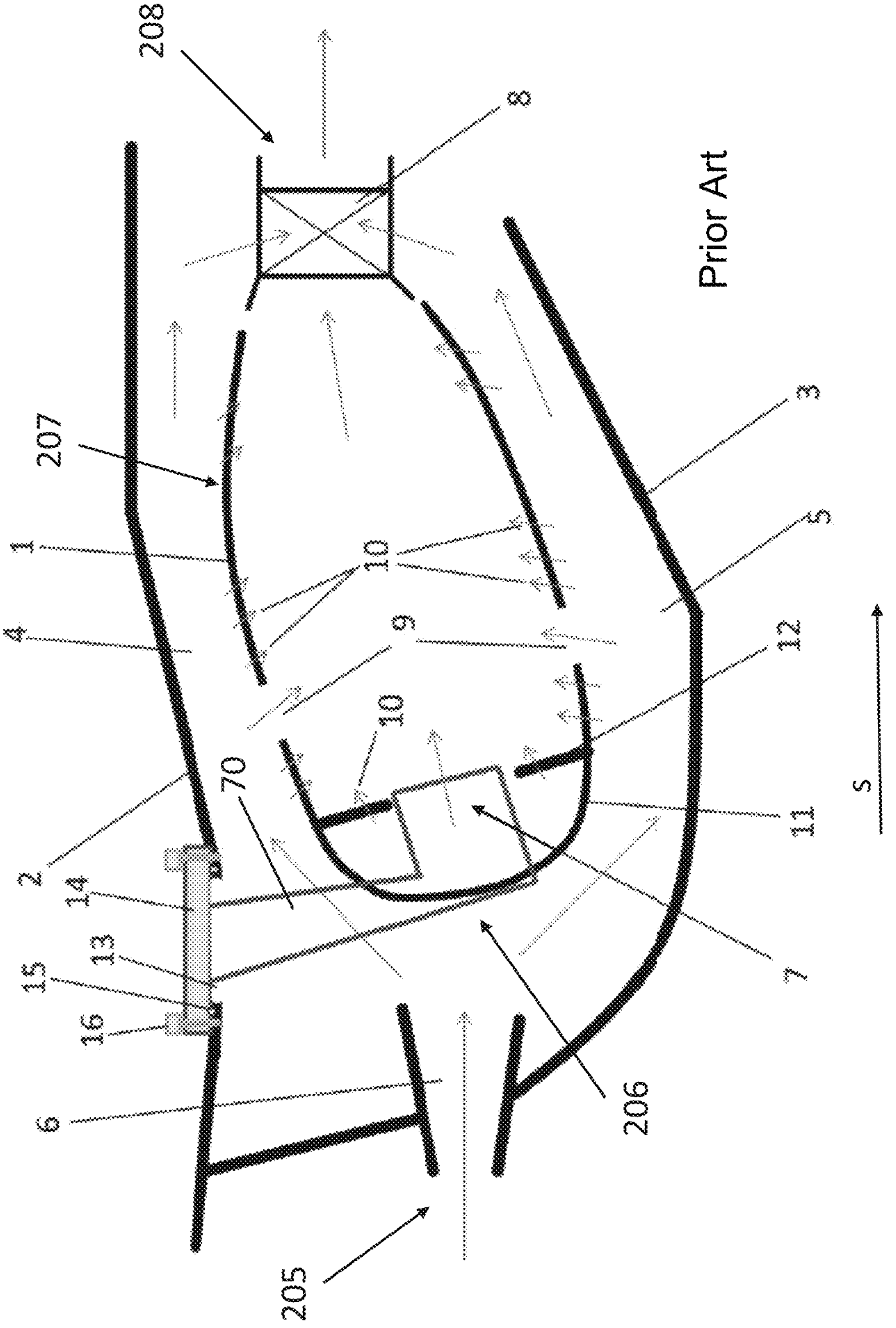
Figure 12B:
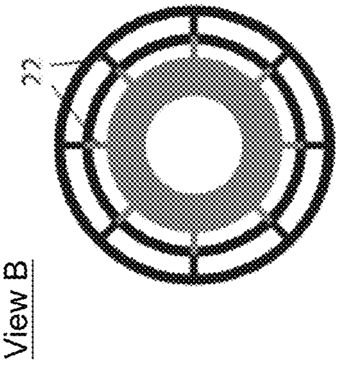
FIG. 12B Prior Art
Figure 12A:
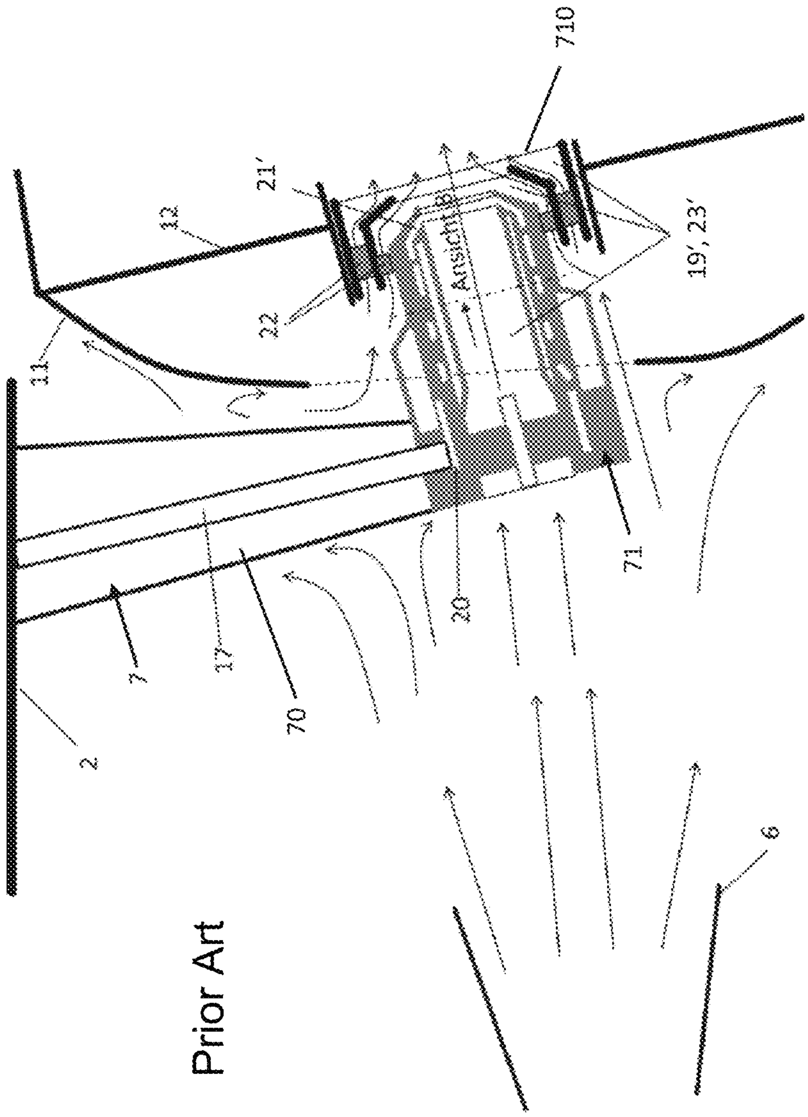
Figure 12C:
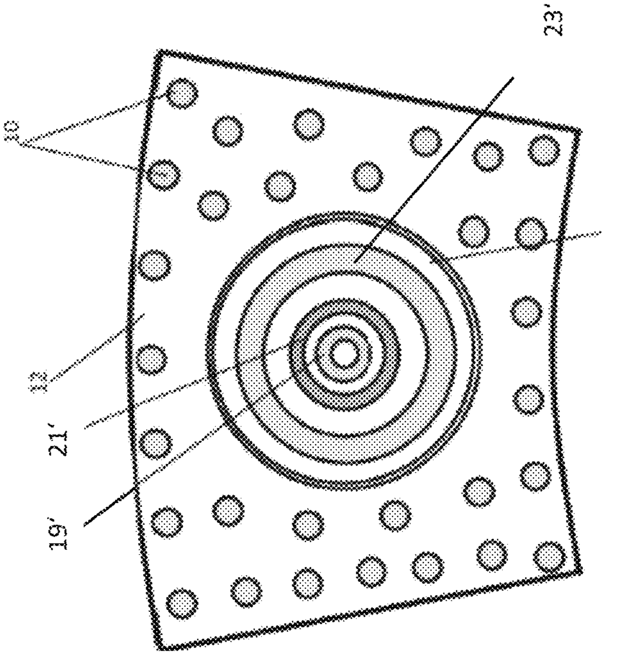
FIG. 12C Prior Art

These show:

FIG. 1 a side view of a design variant of a proposed fuel nozzle;

FIG. 2 a top view of an end face of a nozzle head of the fuel nozzle of FIG. 1;

FIGS. 2A-2C examples of different cross sections for first outflow openings for hydrogen at the fuel nozzle of FIGS. 1 and 2;

FIG. 3 in detail and with regard to the end face of the nozzle head of the fuel nozzle in FIGS. 1 and 2 in an intended installation state in which the nozzle head is accommodated in a passage opening of a heat shield of the combustion chamber;

FIG. 4 an alternatively configured nozzle head in a view corresponding to FIG. 3;

FIG. 5 an alternatively configured fuel nozzle in view corresponding to FIG. 2, in which multiple second outflow openings for air alongside one another are provided at an end face of the nozzle head;

FIG. 6 the nozzle head of the fuel nozzle of FIG. 5 in an intended installation state in a view corresponding to FIGS. 3 and 4;

FIG. 7A a possible development of the nozzle head of FIG. 6 with the guide elements provided at the second outflow openings in a view corresponding to FIG. 6;

FIG. 7B a section diagram corresponding to the section line shown in FIG. 7A;

FIGS. 8A-8B an alternative configuration of the nozzle head with guide elements within flow ducts of the nozzle head that open into the second outflow openings in views corresponding to FIGS. 8A and 8B;

FIG. 9 in top view and in schematic form, an aircraft having two engines each having at least one fuel nozzle as per the solution proposed;

FIG. 10 in schematic form, the construction of one of the engines of the aircraft of FIG. 9, which are each operated with hydrogen;

FIG. 11 a combustion chamber assembly known from the prior art, in which a conventional fuel nozzle for the injection of kerosene is provided in a combustion chamber;

FIG. 12A a fuel nozzle known from the prior art according to FIG. 11 in an enlarged partial section diagram;

FIG. 12B a section view of the fuel nozzle of FIG. 12A;

FIG. 12C looking at an end face of a nozzle head of the fuel nozzle of FIGS. 12A, the installed fuel nozzle with the nozzle head accommodated in a passage opening of a heat shield.

FIG. 9 shows, in top view, an aircraft 101, for example a passenger aircraft. The aircraft 101 has a fuselage 102 having two wings, on each of which is provided an engine 103, for example a turbofan engine. A hydrogen storage tank 104 is accommodated in the fuselage 102 of the aircraft 101. In this hydrogen storage tank 104, hydrogen is stored as fuel for the engines 103, for example in liquid form. The hydrogen from the hydrogen storage tank 104 is provided via a fuel feed system 201 (cf. FIG. 10) to the engines 103, and utilized there for combustion in a respective core engine 105, in order to drive a fan of the respective engine 103.

The block diagram of FIG. 10 illustrates the construction of the core engine 105 of an engine 103 in detail. According to FIG. 10, hydrogen from the hydrogen storage tank 104 is provided as fuel to the respective core engine 105 via the fuel supply system 201. The core engine 105, in a main flow direction s that coincides with a center axis of the engine 103, has, in axial succession, a low-pressure compressor 202, a high-pressure compressor 204, a diffuser 205, a fuel injection system 206, a combustion chamber 207, a high-pressure turbine 208, a low-pressure turbine 209 and an outlet nozzle 210. The low-pressure compressor 202 and the high-pressure compressor 204 are connected to one another in the block diagram of FIG. 10 via a connecting duct 203. The high-pressure compressor 204 is driven by the high-pressure turbine 208 via a first shaft 211, while the low-pressure compressor 203 is driven by the low-pressure turbine 209 via a second shaft 212. Rather than the two-shaft design for the coupling which is apparent in FIG. 10, it is of course also possible to provide a three-shaft design.

In the operation of the engine 103, the low-pressure turbine 209 drives a fan 213 of the engine 103 via a (step-down) transmission unit 214. The transmission unit 214 is connected to the second shaft 212 on the drive side, and is coupled to the fan 213 via a fan shaft 215 on the output side. For example, the transmission unit 214 has an epicyclic step-down transmission. Alternatively or additionally, a planetary transmission may be part of the drive unit 214, although alternative drive designs are of course also possible. In principle, it is also possible to recess a transmission unit 214, such that the second shaft 212 driven by the low-pressure turbine is coupled directly to the fan 213.

FIG. 11 shows a configuration, known from the prior art, of a combustion chamber assembly with the fuel injection system 206 and the combustion chamber 207, via which the turbine stages of the high-pressure turbine 208 and of the low-pressure turbine 209 can be driven. The combustion chamber 207 defines a combustion space delineating by a combustion chamber wall 1. The offgas formed in the combustion in the combustion space is guided in main flow direction s via a turbine stator, especially what is called a turbine inlet guide vane 8, to the high-pressure turbine 208. Upstream, the combustion chamber 207 has a combustion chamber head 11 and, downstream thereof, a heat shield 12 accommodating a nozzle head of a fuel nozzle 7 of the fuel injection system 206. The heat shield 12 and the combustion chamber head 11 are in practice frequently joined to one another as a welded construction. The combustion chamber 207 is also disposed between a (radially) outer housing 2 and a (radially) inner housing 3 of the combustion chamber assembly.

From the high-pressure compressor 205, an air flow is guided through the diffuser 205 and lastly through pre-diffuser 6 into a housing space accommodating the combustion chamber 207. The air flow coming from the pre-diffuser 6 is divided here. A portion of the air flow is routed into the combustion space via the combustion chamber head 11, cooling air bores 10 in the heat shield 12, and the nozzle head of the fuel nozzle 7, in order to provide an ignitable air-fuel mixture therein. A further portion of the air from the pre-diffuser 6 flows in two (outer and inner) flow spaces 4 and 5 formed between an outer shell surface of the combustion chamber wall 1 and housings 2 and 3. A portion of the air flow flows here into the (outer) flow space 4 between the combustion chamber wall 1 and the outer housing 2 in which the combustion chamber 207 is fully accommodated. A further portion of air flow flows into the (inner) flow space 5 between the combustion chamber wall 1 and the radially inner housing 3. The air that passes into the inner and outer flow spaces 4 and 5 serves to cool the combustion chamber wall 1. For example, it is especially possible to guide (cooling) air from outside into the combustion chamber through cooling air bores 10 for more efficient cooling of the combustion chamber wall 1 and especially combustion chamber shingles provided thereon on the combustion space side. Furthermore, the combustion chamber wall 1 has additional air-mixing holes 9 in order to route a portion of the air from the flow spaces 4 and 5 into the combustion space as mixing air. Furthermore, air from the flow spaces 4 and 5 downstream of the combustion chamber 207 can also be utilized for cooling of the turbine stator 8.

For the provision of the ignitable air-fuel mixture, the fuel provided by the fuel injection system 206 is mixed with air in the fuel nozzle 7 in the region of the heat shield 12. For this purpose, a nozzle head of the fuel nozzle 7 is accordingly disposed at the combustion chamber head 11 of the combustion chamber 207. The nozzle head of the fuel nozzle 7 is provided here at an end of a nozzle stem 70 of the fuel nozzle 7 that projects radially inward, fixed on the outer housing 2 or a housing wall of this outer housing 2. In this case, the nozzle stem 70 projects through a passage hole 13 in the housing wall of the (outer) housing 2, and is secured with sealing via a securing flange 14 on the housing wall of the housing 2. In FIG. 11, the securing flange 14 is connected by way of example via screws 16 to the housing 2. The passage hole 13 is sealed at the housing wall of the housing 2 via a seal 15 on the securing flange 14.

A fuel nozzle 7 known from the prior art is illustrated in detail in FIGS. 12A, 12B and 12C on an enlarged scale and in different views in its installed state in the combustion chamber 207.

The fuel nozzle 7 has, within the nozzle stem 70, an internal fuel feed 17 via which fuel is supplied to a nozzle head 71 of the fuel nozzle 7. The nozzle head 71 is accommodated in a passage opening of the heat shield 12, in order to provide an ignitable fuel-air mixture via outflow openings 19' and 21' for air and fuel that are provided at an end face 710 of the nozzle head 71, downstream of the nozzle head 71 in the combustion space of the combustion chamber 207. In the nozzle head 71, the fuel passes from the fuel feed 17 into a distributor 20 via which the fuel can flow out downstream via a first outflow opening 21' having a cross section in the form of a circular ring. The first outflow opening 21' for the fuel is formed here at the nozzle head 71 in a cross section akin to an annular gap. This is also apparent in the cross-sectional view of FIG. 12B, which additionally illustrates the circular cylindrical form of the nozzle head 71.

At the end face 710 of the nozzle head 71, a (first) air flow is generated via a central second outflow opening 19', which is radially further inward, based on the first outflow opening 21' for the fuel in the form of a circular ring. Additional air flows are provided via additional outflow openings 23' that are radially further outward. These additional third outflow openings 23' may be provided in the nozzle head 71 itself, but are radially further outward and are not formed on a core of the nozzle head 71 in which the distributor 20 for the fuel is formed.

In a flow duct that opens within the central second outflow opening 19', and in flow ducts that each open within one of the additional third outflow openings 23', air guide elements 22 may be provided for swirling the respective air flow. Such air guide elements 22 (also called swirl elements) thus cause the air to flow out with an additional momentum, which improves mixture formation.

With reference to the view of the end face 710 of the nozzle head 71 which is shown in FIG. 12C, and hence an inner face of the heat shield 12 facing the combustion space of the combustion chamber 207, the customary circular cylindrical configuration of the nozzle head 71 of a fuel nozzle 7 according to the prior art is illustrated once again. Also apparent therefrom are the mutually concentric outflow openings 19', 21' and 23', each in the form of a circular ring.

While the design of a fuel nozzle according to FIGS. 12A, 12B and 12C does indeed offer advantages for the injection of an air-fuel mixture in the case of liquid fuel, such a fuel nozzle has been found to be disadvantageous in the case of a hydrogen-driven engine 103 in which gaseous hydrogen is to be injected as fuel into the combustion chamber 207. Here, a proposed fuel nozzle constitutes a considerable improvement, for which the different possible variants are shown by way of example by FIGS. 1 to 8B.

In this case, each of the design variants at the end face 710 of the nozzle head 71 of the fuel nozzle 7 envisages multiple first outflow openings 21 for hydrogen to be injected and at least one second outflow opening 19 for air to be injected. The at least one second outflow opening 19 is designed here with a polygonal cross section, or a polygonal cross-sectional area for flow, and multiple first outflow openings 21 for the hydrogen are distributed at the end face around the at least one second outflow opening 19 in each case.

In each case here, for example, in accordance with the lateral section view of FIG. 1, the fuel—hydrogen here—is guided to the nozzle head 71 via the internal fuel feed 17 provided in the nozzle stem 70. At the nozzle head 71, hydrogen is then injected at the end face 71 via discrete first outflow openings 21. The hydrogen is provided here to the first outflow openings 21 from the fuel feed 17 via a distributor 20 on the nozzle head side.

In the design variant of FIGS. 1 and 2, the nozzle head 71 is formed with a rectangular cross section and has a single central second outflow opening 19 with a likewise rectangular cross section for air to be injected. Arranged around this central second outflow opening 19 is a multitude of first outflow openings 21 for hydrogen. The first outflow openings 21 for hydrogen to be injected here have a cross-sectional area for flow which is only a fraction of the cross-sectional area for flow of the central second outflow opening 19 for air. By comparison with a cross-sectional area of the central second outflow opening 19, the first outflow openings 21 are in the form of dots on the end face in front view, such that the hydrogen exits via a plurality or multitude of small injection nozzles on the end face 710 of comparatively large area.

The cross sections of the first inflow openings 21 may, for example, in accordance with FIGS. 2A, 2B and 2C, be round, especially circular (FIG. 2A), but also polygonal, especially tetragonal, and hence, for example, rhombus-shaped (FIG. 2B) or hexagonal (FIG. 2C).

The nozzle head 71 of the fuel nozzle 7 of FIGS. 1 and 2, in the state installed as intended, is likewise accommodated in a passage opening of a heat shield 12 on the combustion chamber side. As apparent here in the view of the end face 710 in FIG. 3, it is possible here for a gap to be formed around the full circumference between an edge of the passage opening on the heat shield side and an edge of the rectangular end face 710. In the design variant of FIG. 3, this gap extends along a rectangular outline. The circumferential gap provides an additional outflow opening 23 for air. Via the additional outflow opening 23, it is thus possible to provide an air flow past the nozzle head 71 in the direction of the combustion space of the combustion chamber 207 for the hydrogen-air mixture to be generated.

In the design variant of FIG. 4, the nozzle head 7 is likewise formed in tetragonal cross section at the end face 710. In this case, however, the shape of the nozzle head 71 corresponds to a greater degree to a circular segment section of the combustion chamber head 11 that extends around a center axis of the engine 103 and of the corresponding heat shield 12. Thus, in the design variant of FIG. 4, the nozzle head 71 is delineated in its cross section by two main edges that run essentially parallel to one another and two lateral edges that connect these main edges to one another (and run essentially radially, for example)—shown on the right and left in FIG. 4. The main edges on the radial outside and radial inside of the nozzle head 71 each extend here along a circular arc in a circumferential direction u (see also FIGS. 5 and 6).

A central second outlet opening 19 for air to be injected, in the design variant of FIG. 4, by comparison with the design variant of FIGS. 2 and 3, is formed in a more longitudinally extended manner in circumferential direction u, but first outflow openings 21 with a much smaller cross section for hydrogen to be injected are likewise provided, distributed over the entire circumference of the central second outflow opening 19.

At a radially outer edge of the nozzle head 71 and a radially outer edge of the passage opening in the heat shield 12 is provided a narrow gap that extends in circumferential direction u as one of two additional third outflow openings 23.1 and 23.2 for an additional air flow. Spaced apart radially therefrom, at a radially inner edge of the nozzle head 71, a second gap is accordingly formed for an additional outflow opening 23.2, in interplay with the passage opening on the heat shield side.

In the design variant of FIG. 5, the end face 710 of the nozzle head 71 of the fuel nozzle 7 has multiple second outflow openings 21 for air to be injected that are alongside one another in the circumferential direction u. The individual second outflow openings 19 here each have a trapezoidal cross section and are each surrounded by a multitude of first outflow openings 19 for the hydrogen to be injected. Thus, in that case, there are especially always multiple (at least two) first outflow openings 19 provided at the end face 71 between two successive second outflow openings 21. It is also optionally possible here for only exactly one first outflow opening 19 to be provided between two successive second outflow openings 19.

In the installed state of the fuel nozzle 7 of FIG. 5, likewise analogously to the design variant of FIG. 4, there is then no gap formed around the full circumference as an additional outflow opening for air to be injected (although this would of course also be possible here). Analogously to the design variant of FIG. 4, instead, there are again two spatially separated, longitudinally extended additional outflow openings 23.1, 23.2, firstly on the radial outside and secondly on the radial inside, between a respective edge of the nozzle head 71 and a respective edge of the passage opening on the heat shield side in which the nozzle head 71 is accommodated.

In a possible development according to FIGS. 7A and 7B, air guide elements 22 are provided in each case in the second outflow openings 19 for air to be injected and in flow ducts 18 that lead to the second outflow openings 19 within the nozzle head 71. By means of these air guide elements that run at an angle to the circumferential direction u (see in particular the cross section diagram of FIG. 7B), a swirl which is advantageous for mixture formation is imparted in each case to an air flow provided in the operation of the engine 103.

In the alternative design variant of FIGS. 8A and 8B, any air guide elements 22 provided for swirling of an air flow are not provided at the outflow openings 19 themselves. Instead, air guide elements 22 here are provided merely within the respective flow ducts 18 that open into corresponding second outflow openings 19. In that case, for example, a respective flow duct 18 within the nozzle head 71, upstream of its end that opens into the second outflow opening 19 and hence downstream, has a corresponding air guide element 22, for example in the form of a guide plate, or a duct wall inclined with respect to a circumferential direction u, in order to impart a swirl to the air stream generated.

Although a proposed fuel nozzle is described above as being especially suitable for the injection of hydrogen, a proposed fuel nozzle will of course also be suitable for the injecting of other liquid or gaseous fuels, for example for the injecting of methane. The multiple first outflow openings 21 may thus also be provided for another fuel to be injected, and in this case may each be arranged distributed around at least one second outflow opening 19 for air to be injected.

LIST OF REFERENCE NUMERALS

1 combustion chamber wall
2 outer housing
3 inner housing
4 outer flow space
5 inner flow space
6 pre-diffuser
7 fuel nozzle
70 nozzle stem
71 nozzle head
710 end face
8 turbine stator
9 air-mixing hole
10 cooling air bore
11 combustion chamber head
12 heat shield
13 passage hole
14 securing flange
15 seal
16 screw
17 fuel feed
18 flow duct
19, 19' second outflow opening (for air)
20 distributor
21 first outflow opening (for hydrogen)
21' first outflow opening (for kerosene)
22 air guide element
23, 23', 23.1, 23.2 additional outflow opening
101 airplane
102 fuselage
103 (turbofan) engine
104 hydrogen storage tank
105 core engine
201 fuel feed system
202 low-pressure compressor
203 connecting duct
204 high-pressure compressor
205 diffuser
206 fuel injection system
207 combustion chamber
208 high-pressure turbine
209 low-pressure turbine
210 outlet nozzle
211 first shaft
212 second shaft
213 fan
214 (step-down) transmission unit
215 fan shaft
s main flow direction
u Circumferential direction

The invention claimed is:

1. A fuel nozzle for injection of hydrogen into a combustion chamber of an engine, said fuel nozzle comprising, for provision of a hydrogen-air mixture, a nozzle head having outflow openings at an end face of the nozzle head, wherein multiple first outflow openings for hydrogen to be injected and at least one second outflow opening for air to be injected are positioned at the end face for the provision of the hydrogen-air mixture, where the at least one second outflow opening has a polygonal cross section and the multiple first outflow openings at the end face are arranged around the at least one second outflow opening;

wherein the end face of the nozzle head is quadrangular or rectangular.

2. The fuel nozzle according to claim 1, wherein the at least one second outflow opening has a tetragonal cross section.

3. The fuel nozzle according to claim 2, wherein the at least one second outflow opening has a rectangular or trapezoidal cross section.

4. The fuel nozzle according to claim 1, wherein the at least one second outflow opening and/or at least one flow duct of the nozzle head that opens into the at least one second outflow opening has at least one air guide element for swirling air flowing out of the at least one second outflow opening.

5. The fuel nozzle according to claim 1, wherein the at least one second outflow opening includes two or more second outflow openings positioned at the end face, around each of which are distributed multiple ones of the first outflow openings for the injection of hydrogen.

6. The fuel nozzle according to claim 5, wherein the two or more second outflow openings are disposed in succession at the end face in a circumferential direction.

7. The fuel nozzle according to claim 1, wherein the multiple first outflow openings each have a circular, rhombus-shaped or hexagonal cross section.

8. A combustion chamber assembly having a combustion chamber for an engine, including the fuel nozzle according to claim 1.

9. The combustion chamber assembly according to claim 8, wherein the combustion chamber includes a heat shield having a passage opening in which the nozzle head of the fuel nozzle is accommodated.

10. The combustion chamber assembly according to claim 9, wherein, via at least one additional outflow opening formed between the nozzle head and an edge of the passage opening, air can flow past the nozzle head into a combustion space of the combustion chamber.

11. The combustion chamber assembly according to claim 10, wherein the at least one additional outflow opening is formed by a gap having a longitudinal extent with regard to the end face of the nozzle head and running along a section of an outer circumference of the nozzle head.

12. The combustion chamber assembly according to claim 10, wherein at least two mutually spatially separated additional outflow openings are formed between the nozzle head and the edge of the passage opening.

13. The combustion chamber assembly according to claim 10, wherein an additional outflow opening that runs around the full circumference of the nozzle head is formed between the nozzle head and the edge of the passage opening.

14. The combustion chamber assembly according to claim 13, wherein the additional outflow opening that runs around the full circumference of the nozzle head has a rectangular outline.

15. An engine with the combustion chamber assembly according to claim 8.

16. A fuel nozzle for injection of hydrogen into a combustion chamber of an engine, said fuel nozzle comprising, for provision of a hydrogen-air mixture, a nozzle head having outflow openings at an end face of the nozzle head, wherein multiple first outflow openings for hydrogen to be injected and at least one second outflow opening for air to be injected are positioned at the end face for the provision of the hydrogen-air mixture, where the at least one second outflow opening has a polygonal cross section and the multiple first outflow openings at the end face are arranged around the at least one second outflow opening;

via at least one additional outflow opening formed between the nozzle head and an edge of the passage opening, the air can flow past the nozzle head into a combustion space of a combustion chamber;

wherein the at least one additional outflow opening is formed by a gap having a longitudinal extent with regard to the end face of the nozzle head and running along a section of an outer circumference of the nozzle head.

* * * * *